United States Patent
Auriac et al.

(10) Patent No.: US 11,945,602 B2
(45) Date of Patent: Apr. 2, 2024

(54) ASSEMBLY FOR AN AIRCRAFT COMPRISING AN INSTRUMENT PANEL AND A SUPPORT SYSTEM FOR A TOUCH TABLET

(71) Applicant: Airbus Operations SAS, Toulouse (FR)

(72) Inventors: Vincent Auriac, Toulouse (FR); Patrick Salgues, Toulouse (FR); Laurent Feuillerac, Toulouse (FR)

(73) Assignee: AIRBUS OPERATIONS SAS, Toulouse (FR)

( * ) Notice: Subject to any disclaimer, the term of this patent is extended or adjusted under 35 U.S.C. 154(b) by 509 days.

(21) Appl. No.: 17/164,514

(22) Filed: Feb. 1, 2021

(65) Prior Publication Data
US 2021/0253267 A1  Aug. 19, 2021

(30) Foreign Application Priority Data
Feb. 3, 2020 (FR) .................. 2001066

(51) Int. Cl.
*B25J 9/06* (2006.01)
*B64D 43/00* (2006.01)
*B64D 45/00* (2006.01)

(52) U.S. Cl.
CPC ...... *B64D 43/00* (2013.01); *B64D 2045/0075* (2013.01)

(58) Field of Classification Search
CPC . B64D 43/00; B64D 2045/0075; B64D 47/00
See application file for complete search history.

(56) References Cited

U.S. PATENT DOCUMENTS

| | | | | |
|---|---|---|---|---|
| 5,179,447 A | * | 1/1993 | Lain ................. | A47C 7/723 348/827 |
| 5,195,709 A | * | 3/1993 | Yasushi ............ | B64D 11/0646 248/584 |
| 6,588,719 B1 | * | 7/2003 | Tubach ............. | F16M 11/2078 248/922 |

(Continued)

FOREIGN PATENT DOCUMENTS

| | | |
|---|---|---|
| CN | 205877654 U | 1/2017 |
| EP | 2808593 A2 | 12/2014 |

(Continued)

OTHER PUBLICATIONS

French Search Report; priority document.

*Primary Examiner* — Amy J. Sterling
(74) *Attorney, Agent, or Firm* — Greer, Burns & Crain, Ltd.

(57) ABSTRACT

An assembly for an aircraft. The assembly comprises a frame, an instrument panel fixed to the frame, a support system with an arm bearing a tray in which the arm positions the tray behind the instrument panel, and in which the tray comprises a first attachment arrangement, and a support comprising a second attachment arrangement which cooperates with the first attachment arrangement to removably fix the support onto the tray. The support also comprises a fixing system which ensures the removable fixing of a touch tablet onto the support. With such an assembly, the touch tablet is held without the aid of the pilot and it is positioned in front of him or her for easy access.

12 Claims, 2 Drawing Sheets

(56) References Cited

U.S. PATENT DOCUMENTS

| | | | | |
|---|---|---|---|---|
| 6,597,294 | B1* | 7/2003 | Ariens | G08G 5/0021 |
| | | | | 701/4 |
| 8,493,726 | B2* | 7/2013 | Visser | G06F 1/1601 |
| | | | | 361/679.05 |
| 9,989,991 | B1* | 6/2018 | Kuefler | G06F 1/182 |
| 10,513,336 | B2* | 12/2019 | Peuziat | F16M 11/2071 |
| 2008/0295301 | A1* | 12/2008 | Carnevali | F16M 13/022 |
| | | | | 24/569 |
| 2012/0261520 | A1* | 10/2012 | Groomes | F16M 11/10 |
| | | | | 244/234 |
| 2014/0209777 | A1* | 7/2014 | Klemin | F16M 11/041 |
| | | | | 29/525.08 |
| 2014/0346296 | A1 | 11/2014 | Tschann et al. | |
| 2016/0318181 | A1* | 11/2016 | Gowda | F16M 11/18 |
| 2016/0368431 | A1* | 12/2016 | Boer | F16M 13/02 |
| 2017/0021928 | A1* | 1/2017 | Satterfield | B60N 2/79 |
| 2018/0334261 | A1* | 11/2018 | Longo | B60R 11/0252 |
| 2019/0185180 | A1* | 6/2019 | Corbefin | A45C 13/008 |
| 2021/0039563 | A1* | 2/2021 | Yashwanth Theriyur Srinivassharma | F16M 11/14 |
| 2021/0179288 | A1* | 6/2021 | Johnson | G06F 1/1626 |

FOREIGN PATENT DOCUMENTS

| | | | |
|---|---|---|---|
| FR | 2663605 | A1 | 12/1991 |
| FR | 3006666 | A1 | 12/2014 |
| IT | CL20110003 | A1 | 8/2012 |

\* cited by examiner

ASSEMBLY FOR AN AIRCRAFT COMPRISING AN INSTRUMENT PANEL AND A SUPPORT SYSTEM FOR A TOUCH TABLET

CROSS-REFERENCES TO RELATED APPLICATIONS

This application claims the benefit of the French patent application No. 2001066 filed on Feb. 3, 2020, the entire disclosures of which are incorporated herein by way of reference.

FIELD OF THE INVENTION

The present invention relates to an assembly for an aircraft in which the assembly comprises an instrument panel and a support system for a touch tablet which ensures that the touch tablet is easily accessible for a pilot. The invention relates also to a cockpit comprising such an assembly and an aircraft comprising such a cockpit.

BACKGROUND OF THE INVENTION

In order to prepare an aircraft before a flight, a pilot can use a touch tablet which is connected to a control unit of the aircraft. The touch tablet is generally held by the pilot or placed on the side of the seat of the pilot. Such an installation is not ergonomic and is impractical for the pilot.
It is therefore necessary to find an arrangement which allows the touch tablet to be positioned optimally for the pilot.

SUMMARY OF THE INVENTION

One object of the present invention is to propose an assembly for an aircraft in which the assembly comprises an instrument panel and a support system for a touch tablet which ensures that the touch tablet is held in front of the pilot.
To this end, an assembly is proposed for an aircraft, the assembly comprising:
  a frame configured to be fixed to a structure of the aircraft,
  an instrument panel fixed to the frame,
  a support system comprising an arm of which a first end is fixed to the frame and a tray mounted at a second end of the arm, in which the arm is arranged to displace the tray alternately from a retracted position in which the tray is inside the instrument panel to an extended position in which the tray is behind the instrument panel, and in which the tray comprises a first attachment means, and
  a support comprising a second attachment means which cooperates with the first attachment means to removably fix the support onto the tray, and a fixing system configured to ensure the removable fixing of a touch tablet onto the support.

With such an assembly, the touch tablet is held without the aid of the pilot and it is positioned in front of him or her for easy access.

Advantageously, the instrument panel comprises a window, and the arm is movable alternately between a lying-flat position in which the tray is projected behind the instrument panel, and a retracted position in which the arm is retracted into the instrument panel by entering through the window.

Advantageously, the transition from the retracted position to the position of use is performed by a translation.

Advantageously, the support comprises a first part and a second part, each part comprises a jaw which faces the jaw of the other part, the two parts are translationally mobile with respect to one another between a tightened position in which the two jaws are brought closer together and a separated position in which the two jaws are moved away from one another, and the support comprises a return means which constrains the two parts into the tightened position.

Advantageously, the link between the first attachment means and the second attachment means takes the form of a fixing of bayonet type.

Advantageously, the second attachment means takes the form of a male cylinder provided with two protruding lugs, the first attachment means takes the form of a female cylinder comprising, for each lug, a groove which extends parallel to a cylinder axis, at the bottom of each groove a recess is provided which extends over the periphery of the female cylinder, and each recess extends on either side of the groove.

Advantageously, the tray is composed of a lower sub-tray fixed to the arm and an upper sub-tray mounted to be rotationally movable on the lower sub-tray between a folded position and an unfolded position, the lower sub-tray has a top face, the upper sub-tray has a bottom face and a top face bearing the first attachment means, in the folded position, the bottom face of the upper sub-tray is against the top face of the lower sub-tray, and in the unfolded position, the top face of the lower sub-tray is aligned with the bottom face of the upper sub-tray.

The invention also proposes a cockpit of an aircraft, the cockpit comprising a seat for a pilot and an assembly according to one of the preceding variants, disposed in front of the seat.

Advantageously, the cockpit comprises a parcel tray disposed alongside the seat, and the parcel tray is equipped with a connector which interconnects with a connector of the touch tablet when the latter is in the parcel tray.

The invention also proposes an aircraft comprising a cockpit according to the preceding variant.

BRIEF DESCRIPTION OF THE DRAWINGS

The features of the invention mentioned above, and others, will become more clearly apparent on reading the following description of an exemplary embodiment, the description being given in relation to the attached drawings, in which.

DETAILED DESCRIPTION OF THE PREFERRED EMBODIMENTS

Figure 1:
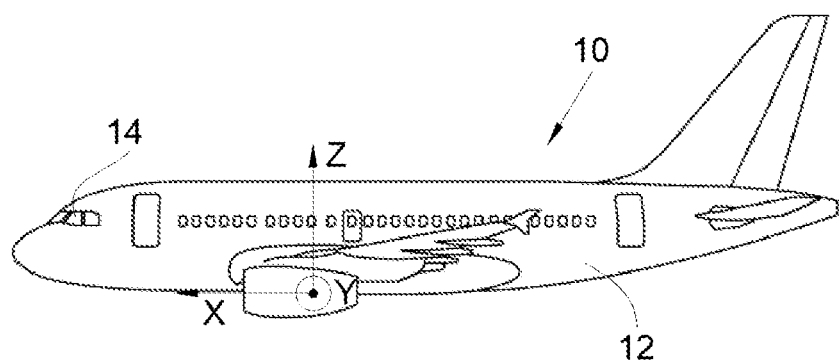
FIG. 1 shows a side view of an aircraft according to the invention.

FIG. 1 shows an aircraft 10 which comprises a fuselage 12, at the front of which there is disposed a cockpit 14 in which at least one pilot sits.
In the following description, and by convention, X denotes the horizontal longitudinal direction of the aircraft oriented positively in the direction of advance of the aircraft, that is to say towards the front of the aircraft, Y denotes the transverse direction of the aircraft which is horizontal when the aircraft is on the ground, and Z denotes the vertical direction or vertical height when the aircraft is on the ground, these three directions X, Y and Z being mutually orthogonal.

Figure 2:
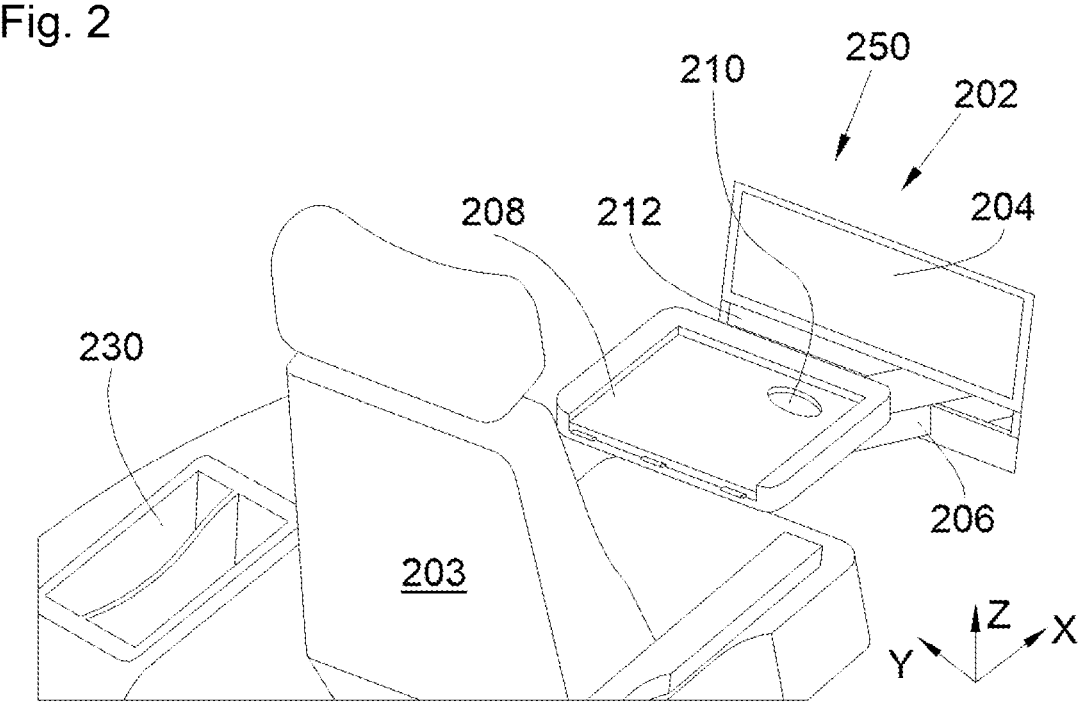
FIG. 2 shows a perspective view from behind of a support system of an assembly with an instrument panel according to the invention.

FIG. 2 shows an assembly 250 which is disposed in the cockpit 14 and in front of a seat 203 for a pilot which comprises a user's space of the aircraft.

The assembly 250 comprises a frame which is fixed to a structure of the aircraft 10 and an instrument panel 204 which is fixed to the frame and which faces the user's space. The instrument panel 204 bears, as is known, various indicators and controls of the aircraft 10 and is positioned in front of the seat 203.

The assembly 250 also comprises a support system 202 which comprises an arm 206 fixed by a first end to the frame and a tray 208 mounted at a second end of the arm 206.

With respect to the general direction of the aircraft 10, the arm 206 is arranged to displace the tray 208 alternately from a retracted position in which the tray 208 is inside the instrument panel 204 to an extended position in which the tray 208 is behind the instrument panel 204 and in front of the pilot and the seat 203, that is to say, more specifically, towards the user's space between the instrument panel 204 and the seat 203. The extended position corresponds to a position of use of the tray 208.

The arm 206 can alternately take two positions, namely, a retracted position which corresponds to the retracted position of the tray 208 and in which the arm 206 is shortened and inside the instrument panel 204, and a lying-flat position which corresponds to the extended position of the tray 208 and in which the arm 206 is recumbent and partly extended from the instrument panel 204.

To facilitate the manipulation of the arm 206, the latter has a handle which allows the arm 206 to be grasped by the pilot. To keep the arm 206 in the lying-flat position, the arm 206 is equipped with locking means which lock it in the lying-flat position when no deliberate action on the part of the pilot is exerted to switch it to the retracted position. These locking means or lock can be any means known to the person skilled in the art, such as, for example, sprung balls. Here, the arm 206 is telescopic.

For the tray 208 to be able to assume an ergonomic position with respect to the pilot, the tray 208 is mounted articulated on the arm 206.

The cockpit 14 also comprises a parcel tray 230 which is disposed alongside the seat 203 and which is within reach of the pilot.

The tray 208 comprises a first attachment means 210 which will be described more specifically hereinbelow.

Figure 3:
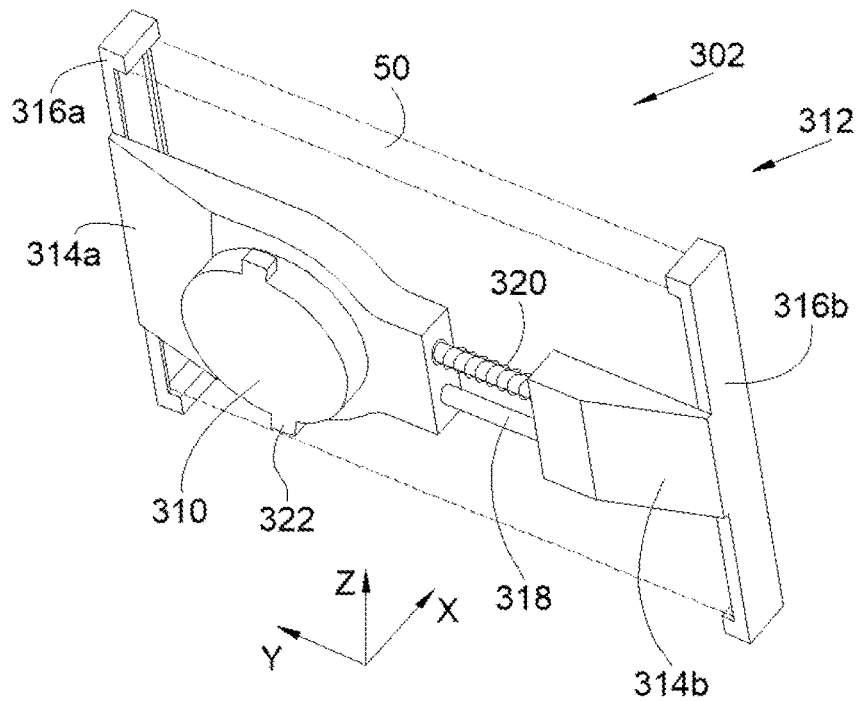
FIG. 3 shows a perspective view from in front of a support of the assembly according to the invention.

The assembly 250 also comprises a support 302 which is represented in FIG. 3.

The support 302 comprises a second attachment means 310 which cooperates with the first attachment means 210 to removably fix the support 302 onto the tray 208.

The support 302 also comprises a fixing system 312 which ensures the removable fixing of a touch tablet 50 onto the support 302.

The removability of the fixings ensures that the separation of the elements is performed without impairment and simply and without tools.

Thus, the placement and the removal of the touch tablet 50 are performed simply and it is always positioned and held ergonomically in front of the pilot. When the touch tablet 50 is not in use, it can be stowed away in the parcel tray 230 while remaining mounted on the support 302.

In the embodiment presented in FIG. 2, the instrument panel 204 comprises a window 212 and, as described above, the arm 206 is mounted to slide on the frame and through the window 212 in a direction of translation to be retracted with the tray 208 into the instrument panel 204 when the pilot does not need the tray 208. The direction of translation is overall at right angles to the plane of the window 212 and, here, globally parallel to the longitudinal direction.

In the extended/lying-flat position, the arm 206 and therefore the tray 208 are projected behind the instrument panel 204 with respect to the orientation of the longitudinal direction of the aircraft 10 and therefore towards the seat 203. In the retracted position, the arm 206 and the tray 208 are retracted into the instrument panel 204 by entering through the window 212.

The support 302 comprises a first part 314a and a second part 314b. Each part 314a-b comprises a jaw 316a-b which faces the jaw 316b-a of the other part 314b-a and the touch tablet 50 is positioned between the jaws 316a-b.

The two parts 314a-b are translationally movable with respect to one another between a tightened position in which the two jaws 316a-b are brought closer together and a separated position in which the two jaws 316a-b are moved away from one another. The support 302 further comprises a return means which constrains the two parts 314a-b into the tightened position.

In the embodiment of the invention presented in FIG. 3, the translation of the two parts 314a-b is performed here by two guides 318 which are fixed to one of the parts 314a-b and in which the other part 314b-a slides along the two guides 318.

The return means is, here, a spring 320 fixed between the two parts 314a-b which are narrow and thick to facilitate the handling thereof by the hands of the pilot.

Figure 4:
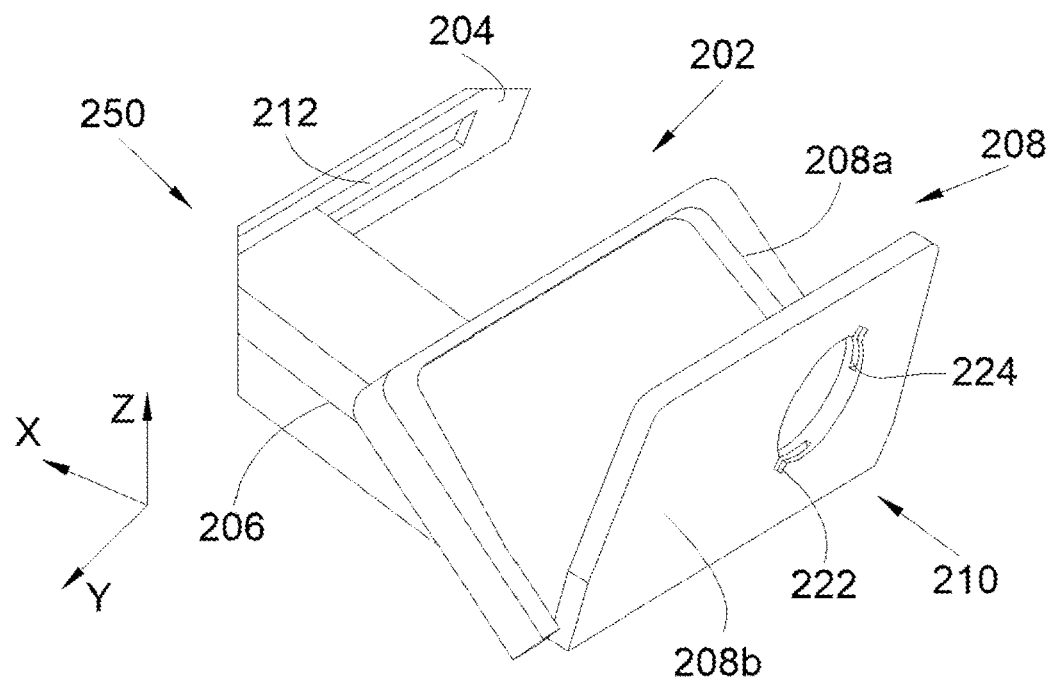
FIG. 4 is a perspective view of the assembly according to the invention.

FIG. 4 shows the support system 202 in a particular position, and in which the tray 208 is composed of two sub-trays 208a-b which are mounted articulated with respect to one another about a hinge link that is horizontal and transverse with respect to the direction of translation of the arm 206.

The tray 208 thus comprises a lower sub-tray 208a and an upper sub-tray 208b. The lower sub-tray 208a is fixed to the arm 206 and the upper sub-tray 208b is therefore mounted articulated on the lower sub-tray 208a and it is rotationally movable between a folded position and an unfolded position. The hinge link is produced at the rear edges of the two sub-trays 208a-b when the upper sub-tray 208b is in the folded position.

The first attachment means 210 is disposed on a top surface of the upper sub-tray 208b.

In the folded position, the upper sub-tray 208b is pressed against the lower sub-tray 208a and has the first attachment means 210 oriented upwards to be accessible and visible by the pilot. The bottom face of the upper sub-tray 208b is thus against the top face of the lower sub-tray 208a. In this position, the support 302 and the touch tablet 50 can be fixed to the upper sub-tray 208b.

In the unfolded position, the upper sub-tray 208b is aligned with the lower sub-tray 208a to constitute a larger surface and allow the pilot to place, for example, a meal tray. In this position, the first attachment means 210 oriented downwards is not accessible by the pilot. The top face of the lower sub-tray 208a is then aligned with a bottom face of the upper sub-tray 208b, here the surface not bearing the first attachment means 210.

In the embodiment of the invention presented in FIGS. 3 and 4, the link between the first attachment means 210 and the second attachment means 310 takes the form of a fixing of bayonet type. The second attachment means 310 is fixed here onto the first part 314a, but it can be fixed onto the second part 314b. Although the link between the attachment means 210 and 310 is shown in the case of a tray 208 with two articulated sub-trays 208a-b, it can be implemented also in the case of a simple tray 208.

The second attachment means 310 takes the form of a male cylinder provided with two radially protruding lugs 322 and the first attachment means 210 takes the form of a female cylinder which is contained here within the thickness of the upper sub-tray 208b. The male cylinder and the female cylinder are coaxial with respect to the same cylinder axis.

The female cylinder comprises, for each lug 322, a radial groove 222 which extends parallel to the cylinder axis.

At the bottom of each groove 222, a recess 224 is provided which extends over the periphery of the female cylinder and which is configured to receive a lug 322 for the locking of the second attachment means 310.

Mounting the second attachment means 310 comprises introducing the male cylinder into the female cylinder, and each lug 322 into a groove 222, and, when each lug 322 has reached the bottom of its groove 222, the second attachment means 310, and therefore the support 302, are pivoted about the cylinder axis to introduce each lug 322 into the corresponding recess 224.

In order to allow the tablet 50 to be positioned in landscape or portrait position, each recess 224 extends on either side of the groove 222, thus allowing a rotation of the second attachment means 310 in two opposite directions.

In the embodiment of the invention presented in FIG. 2, the two grooves 222 are aligned with one another and offset by 45° with respect to the longitudinal direction X, and each recess 224 extends to 45° on either side of the groove 222.

The parcel tray 230 can be equipped with a connector which interconnects with a connector of the touch tablet 50 when the latter is in the parcel tray 230 to ensure the electrical recharge of the battery of the touch tablet 50. According to a particular embodiment, the connector of the parcel tray 230 is at the bottom of the parcel tray 230 to allow an easy interconnection of the two connectors simply by lowering of the touch tablet 50.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. An assembly for an aircraft, said assembly comprising:
   a frame configured to be fixed to a structure of the aircraft,
   an instrument panel fixed to the frame and facing a user's space in the aircraft,
   a support system comprising an arm of which a first end is fixed to the frame and a tray mounted at a second end of the arm, in which the arm is arranged to displace the tray alternately from a retracted position in which the tray is inside the instrument panel to an extended position in which the tray is extended in a direction towards the user's space, and in which the tray comprises a first attachment means, and
   a support comprising a second attachment means which cooperates with the first attachment means to removably fix the support onto the tray, and a fixing system configured to ensure a removable fixing of a touch tablet onto the support,
   wherein the tray is composed of a lower sub-tray fixed to the arm and an upper sub-tray mounted to be rotationally movable on the lower sub-tray between a folded position and an unfolded position, in that the lower sub-tray has a top face,
   wherein the upper sub-tray has a bottom face and a top face bearing the first attachment means,
   wherein, in the folded position, the bottom face of the upper sub-tray is against the top face of the lower sub-tray, and
   wherein, in the unfolded position, the top face of the lower sub-tray is aligned with the bottom face of the upper sub-tray.

2. The assembly according to claim 1, wherein the instrument panel comprises a window, and wherein the arm is movable alternately between a lying-flat position of use in which the tray is projected towards the user's space, and a retracted position in which the tray is retracted into the instrument panel by entering through the window.

3. The assembly according to claim 2, wherein a transition from the retracted position to the position of use is performed by a translation.

4. The assembly according to claim 1, wherein the support comprises a first part and a second part, wherein the first part comprises a first jaw and the second part comprises a second jaw, the first and second jaws facing each other, wherein the first and second parts are translationally movable with respect to one another between a tightened position in which the first and second jaws are brought closer together and a separated position in which the first and second jaws are moved away from one another, and wherein the support comprises a return means which constrains the two parts into the tightened position.

5. The assembly according to claim 1, wherein a link between the first attachment means and the second attachment means is formed as a fixing of bayonet type.

6. The assembly according to claim 5,
   wherein the second attachment means is formed as a male cylinder provided with two protruding lugs,
   wherein the first attachment means is formed as a female cylinder comprising, for each lug, a groove which extends parallel to a cylinder axis,
   wherein at the bottom of each groove a recess is provided which extends over a periphery of the female cylinder, and
   wherein each recess extends on either side of the groove.

7. A cockpit of an aircraft, said cockpit comprising a seat for a pilot and an assembly for an aircraft, said assembly comprising:
   a frame configured to be fixed to a structure of the aircraft,
   an instrument panel fixed to the frame and facing a user's space in the aircraft,
   a support system comprising an arm of which a first end is fixed to the frame and a tray mounted at a second end of the arm, in which the arm is arranged to displace the tray alternately from a retracted position in which the tray is inside the instrument panel to an extended position in which the tray is extended in a direction towards the user's space, and in which the tray comprises a first attachment means, and a support comprising a second attachment means which cooperates with the first attachment means to removably fix the support onto the tray, and a fixing system configured to ensure a removable fixing of a touch tablet onto the support, wherein said assembly is disposed in front of said seat, said cockpit further comprising:

a parcel tray disposed alongside the seat, and wherein the parcel tray is equipped with a connector which interconnects with a connector of the touch tablet when the latter is in the parcel tray.

8. The assembly according to claim 7, wherein the instrument panel comprises a window, and wherein the arm is movable alternately between a lying-flat position of use in which the tray is projected towards the user's space, and a retracted position in which the tray is retracted into the instrument panel by entering through the window.

9. The assembly according to claim 8, wherein a transition from the retracted position to the position of use is performed by a translation.

10. The assembly according to claim 7, wherein the support comprises a first part and a second part, wherein the first part comprises a first jaw and the second part comprises a second jaw, the first and second jaws facing each other, wherein the first and second parts are translationally movable with respect to one another between a tightened position in which the first and second jaws are brought closer together and a separated position in which the first and second jaws are moved away from one another, and wherein the support comprises a return means which constrains the two parts into the tightened position.

11. The assembly according to claim 7 wherein a link between the first attachment means and the second attachment means is formed as a fixing of bayonet type.

12. The assembly according to claim 11, wherein the second attachment means is formed as a male cylinder provided with two protruding lugs, wherein the first attachment means is formed as a female cylinder comprising, for each lug, a groove which extends parallel to a cylinder axis, wherein at the bottom of each groove a recess is provided which extends over a periphery of the female cylinder, and wherein each recess extends on either side of the groove.

* * * * *